Patented Jan. 18, 1949

2,459,501

UNITED STATES PATENT OFFICE 2,459,501

POLYMERIC MONO-ISOOLEFINIC MATERIALS AND PROCESS OF MAKING SAME

John Melvin Coon, Verona, and John B. Rust, West Orange, N. J.

No Drawing. Application June 19, 1944, Serial No. 541,100

10 Claims. (Cl. 260—78.5)

This invention relates to polymers and particularly to high molecular weight polymers of an unsaturated alcohol ester of an alpha beta unsaturated dicarboxylic acid and an olefin particularly an isoolefin, and method of making the same.

It is known that isobutylene can be polymerized to bodies of high molecular weight at low temperatures of the order of —40° C. to —100° C. For such processes, catalysts are used, for example, the active halide catalysts such as boron trifluoride and aluminum chloride; sulfuric acid and active clay catalysts are also applicable.

Among the objects of the present invention is the production of polymers of an olefin in the presence of an unsaturated alcohol ester of an alpha beta unsaturated dicarboxylic acid to produce products of controlled characteristics.

Other and further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In accordance with the present invention, a polymer is produced from an olefin, particularly a monoisoolefin, in the presence of an unsaturated alcohol ester of an alpha beta unsaturated dicarboxylic acid. Such polymers may be produced, for example, by polymerization of mixtures of the stated constituents at low temperatures in the presence of a polymerization catalyst, specifically a Friedel-Crafts catalyst.

With reference to the polymerizable olefin employed, the mono-isoolefins are particularly emphasized. Such isoolefins may be illustrated by the formula

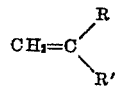

in which R and R' are alkyl groups and not hydrogen. As illustrating such isoolefins there may be specifically mentioned isobutylene, isoamylene, isohexylene, and the like. Because of its availability, isobutylene will be utilized to illustrate the isoolefin constituent of the polymerization mixture.

As unsaturated alcohol esters of alpha beta unsaturated dicarboxylic acids there may be employed, unsaturated dicarboxylic acid esters, particularly olefin dicarboxylic acid esters of olefin alcohols, such as allyl, methallyl, crotyl, and butenyl alcohols, as well as acetylene alcohols such as propargyl and butinyl alcohols. The alpha beta unsaturated dicarboxylic acids are illustrated by maleic, chlor maleic, ethyl maleic, alkoxy maleic, fumaric, citraconic, itaconic, and the like. The esters employed may be mono- or di-esters of such dicarboxylic acids.

By adjustment of the ratio of olefin such as isoolefin to unsaturated ester in the reaction mixture, the properties of the resulting polymer may be controlled; but the properties of the resulting polymerization product also depend on the conditions of polymerization and the ultimate molecular weight of the polymer can be controlled both by the lowness of the temperature and to some extent by the catalyst used or its concentration. Thus, the proportion of polymerizable monoolefin or isoolefin to the ester can be varied to control the desirable properties in the product. The amount of ester employed in its ratio to the polymerizable monoolefin, should not be so great as to interfere with the properties given to the polymer by the presence of the olefin constituent. The ratio of isoolefin, for example, to ester may be from 10:5 to 10:1, with ratios of 10:2 to 10:1 preferred.

The temperature employed is desirably below 0° C. and preferably between —40° C. and —100° C., with temperatures below about —50° C. and preferably below —60° C. most desirable.

Various polymerization catalysts may be employed such as boron trifluoride, aluminum chloride, etc., the Friedel-Crafts catalysts being desirably used. Such Friedel-Crafts reagents may be used in the form of a complex such as those formed with ethers, esters, acids, inorganic salts, and the like. Any excess of catalyst present in the polymerization product may be removed by dissolving the reaction product, if made in the absence of diluents, with benzene, low boiling petroleum hydrocarbons, etc., and precipitating the reaction product with either alcohol or acetone or other non-solvent for the polymerization product, followed by a water wash.

Inert diluents may be present, the preferred diluents being low boiling petroleum hydrocarbons, particularly those which are gaseous at room temperature but liquid at the low temperature at which polymerization is carried out, illustrated for example by propane.

In practicising the invention, the monoolefin, specifically mono-isoolefin such as isobutylene (boiling point —6° C.) and the unsaturated ester such as diallyl maleate are mixed at a temperature preferably below −60° C. The mixed liquid substances are then treated with the polymerization catalyst, for example, boron trifluoride, which may be led into the solution beneath the surface thereof. The polymerization occurs rapidly to produce the desired polymer. The presence of sulfur compounds or hydrogen sulfide which act as poisoning agents is to be avoided.

The following examples illustrate the invention, the parts being by weight.

*Example 1.*—10 parts of isobutylene were condensed in a reactor and cooled to about −80° C. in a dry ice acetone bath. 1 part of allyl fumarate was added and allowed to cool. Boron trifluoride was bubbled through the mixture until polymerization was complete. The polymers were removed from the reactor and washed with acetone. A colorless viscous extensible material was obtained.

*Example 2.*—The procedure used in Example 1 was followed in other examples which may be tabulated as follows:

Table

| Experiment No. | Allyl Ester | Parts Used | Isobutylene Parts Used | Description of Polymers Obtained |
|---|---|---|---|---|
| 1 | Allyl maleate | 1 | 10 | Colorless viscous extensible mass more resilient than blank. |
| 2 | do | 2 | 10 | Same as 1, but more viscous and tough. |
| 3 | Allyl fumarate | 1 | 10 | More viscous than blank, less extensible. |
| 4 | Allyl itaconate | 2 | 10 | Same as blank. |
| 5 | do | 2 | 10 | More viscous than blank, tough. |
| 6 | Allyl citraconate | 1 | 10 | Like 1, but less tacky and more rubbery. |
| 7 | do | 2 | 10 | Most rubbery, shorter extensibility than blank. |
| Blank | | | 10 | Colorless viscous tacky mass. |

These examples illustrate how the proportion of unsaturated ester may be utilized in controlling the properties of the ultimate polymer, particularly from the standpoint of tackiness, extensibility, resilience, toughness, etc.

Having thus set forth our invention, we claim:

1. A soft, elastic and rubbery polymerization product produced by the method of claim 6.
2. A soft, elastic and rubbery polymerization product produced by the method of claim 7.
3. A soft, elastic and rubbery polymerization product produced by the method of claim 8.
4. A soft, elastic and rubbery polymerization product produced by the method of claim 9.
5. A soft, elastic and rubbery polymerization product produced by the method of claim 10.
6. The method of producing polymerization products which comprises preparing a mixture consisting of a mono-isoolefin and an unsaturated aliphatic alcohol ester of an alpha beta olefin discarboxylic acid, the alcohol being selected from the group consisting of allyl, methallyl, crotyl, butenyl, propargyl and butinyl alcohols, in the ratio of 10:1 to 10:5 by weight and subjecting said mixture while liquid to the action of a Friedel-Crafts catalyst at a temperature below −40° C. to form a soft, elastic and rubbery product.
7. The method of producing polymerization products which comprises preparing a mixture consisting of isobutylene and an unsaturated aliphatic alcohol ester of an alpha beta olefin dicarboxylic acid, the alcohol being selected from the group consisting of allyl, methallyl, crotyl, butenyl, propargyl and butinyl alcohols, in the ratio of 10:1 to 10:5 by weight and subjecting said mixture while liquid to the action of a Friedel-Crafts catalyst at a temperature below −40° C. to form a soft, elastic and rubbery product.
8. The method of producing polymerization products which comprises preparing a mixture consisting of isobutylene and an allyl ester of an acid having the formula $COOH.CH=CH.COOH$, in the ratio of 10:1 to 10:5 by weight and subjecting said mixture while liquid to the action of a Friedel-Crafts catalyst at a temperature between −40° C. and −100° C. to form a soft, elastic and rubbery product.
9. The method of producing polymerization products which comprises preparing a mixture consisting of isobutylene and allyl itaconate, in the ratio of 10:1 to 10:5 by weight and subjecting said mixture while liquid to the action of a Friedel-Crafts catalyst at a temperature between −40° C. and −100° C. to form a soft, elastic and rubbery product.
10. The method of producing polymerization products which comprises preparing a mixture consisting of isobutylene and allyl citraconate, in the ratio of 10:1 to 10:5 by weight and subjecting said mixture while liquid to the action of a Friedel-Crafts catalyst at a temperature between −40° C. and −100° C. to form a soft, elastic and rubbery product.

JOHN MELVIN COON.
JOHN B. RUST.

REFERENCES CITED

The following references are of record in the file of this patent:

UNITED STATES PATENTS

| Number | Name | Date |
|---|---|---|
| 2,182,316 | Hopff et al. | Dec. 5, 1939 |
| 2,213,423 | Wiezevich | Sept. 3, 1940 |
| 2,221,663 | Rothrock | Nov. 12, 1940 |
| 2,310,731 | D'Alelio | Feb. 9, 1943 |